US009460418B2

(12) United States Patent
Katz

(10) Patent No.: US 9,460,418 B2
(45) Date of Patent: *Oct. 4, 2016

(54) MONITORING RESPONSES TO CHANGES TO BUSINESS PROCESS ASSETS

(71) Applicant: INTERNATIONAL BUSINESS MACHINES CORPORATION, Armonk, NY (US)

(72) Inventor: Bruce R. Katz, Sudbury, MA (US)

(73) Assignee: International Business Machines Corporation, Armonk, NY (US)

( * ) Notice: Subject to any disclaimer, the term of this patent is extended or adjusted under 35 U.S.C. 154(b) by 42 days.

This patent is subject to a terminal disclaimer.

(21) Appl. No.: 14/635,091

(22) Filed: Mar. 2, 2015

(65) Prior Publication Data

US 2016/0019483 A1 Jan. 21, 2016

Related U.S. Application Data

(63) Continuation of application No. 14/332,449, filed on Jul. 16, 2014, now Pat. No. 9,317,836.

(51) Int. Cl.
*G06F 9/44* (2006.01)
*G06Q 10/10* (2012.01)
*G06Q 10/06* (2012.01)
*G06F 3/0484* (2013.01)
*G06F 3/0481* (2013.01)

(52) U.S. Cl.
CPC ........... *G06Q 10/10* (2013.01); *G06F 3/04817* (2013.01); *G06F 3/04842* (2013.01); *G06F 8/10* (2013.01); *G06F 8/33* (2013.01); *G06F 8/36* (2013.01); *G06Q 10/067* (2013.01); *G06Q 10/06312* (2013.01); *G06Q 10/06316* (2013.01)

(58) Field of Classification Search
CPC ............... G06F 8/33; G06F 8/36; G06F 8/10
USPC .................................... 717/104, 111
See application file for complete search history.

(56) References Cited

U.S. PATENT DOCUMENTS

| 8,386,931 | B2 | 2/2013 | Guckenheimer |
| 9,203,879 | B2 * | 12/2015 | Austin-Lane .......... G06Q 30/02 |
| 2011/0029878 | A1 | 2/2011 | Matsumoto |
| 2011/0207483 | A1 * | 8/2011 | Weinstein ............. H04W 4/001 |
| | | | 455/466 |
| 2014/0059144 | A1 | 2/2014 | Lehmann et al. |

OTHER PUBLICATIONS

List of IBM Patents or Patent Application Treated as Related—Apr. 16, 2015, pp. 1-2.
IBM Corporation, "IBM Endpoint Manager for Core Protection", IBM Corporation, Retrieved July 14, 2014, pp. 1-3.
IBM Corporation, "IBM Endpoint Manager for Software Use Analysis", IBM Corporation, Retrieved Jul. 14, 2014, pp. 1-3.
IBM Corporation, "Integrated Process Guidance", IBM Corporation, Retrieved Jul. 14, 2014, pp. 1-2.
D. Tavassoli, "The Challenges of Dispersed Software Development", searchsoftwarequality.com, Techtarget, Dec. 2008, pp. 1-3.

* cited by examiner

*Primary Examiner* — Phillip H Nguyen
(74) *Attorney, Agent, or Firm* — Law Office of Jim Boice

(57) ABSTRACT

A method, system, and/or computer program product monitors a response to a notification of a change to a business process. Criteria for delivery of a notification of a change to a business process are configured. In response to the criteria being met, the notification of the change to the business process is transmitted to a receiving device. The receiving device is monitored for a response to the notification of the change to the business process. In response to detecting no response to the notification of the change to the business process from the receiving device within a predefined amount of time, a corrective instruction is issued to a monitoring device.

14 Claims, 6 Drawing Sheets

MONITORING RESPONSES TO CHANGES TO BUSINESS PROCESS ASSETS

BACKGROUND

The present disclosure relates to the field of computers, and specifically to the use of computers that provide business process services. Still more particularly, the present disclosure relates to tracking end-users' responses to notifications to changes to assets used with business process services.

A business process service provides a solution to a customer through the use of multiple resources. For example, a bookkeeping service can be provided on-line, such that a user sees a webpage or similar user interface, which is supported by back-end resources such as applications, databases, etc. These back-end resources are also known as business process assets.

SUMMARY

A method, system, and/or computer program product monitors a response to a notification of a change to a business process. Criteria for delivery of a notification of a change to a business process are configured. In response to the criteria being met, the notification of the change to the business process is transmitted to a receiving device. The receiving device is monitored for a response to the notification of the change to the business process. In response to detecting no response to the notification of the change to the business process from the receiving device within a predefined amount of time, a corrective instruction is issued to a monitoring device.

DETAILED DESCRIPTION

Figure 1:
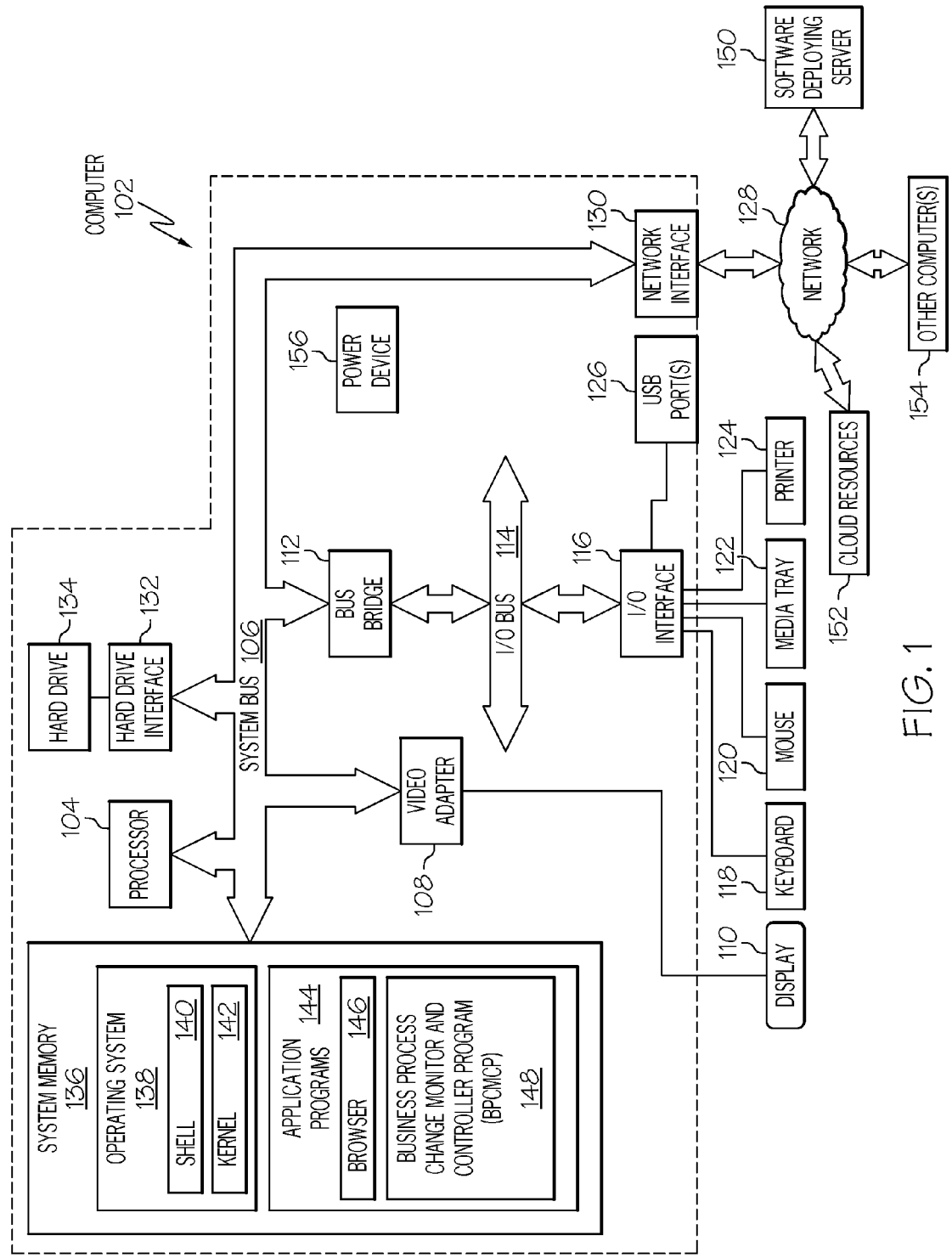
FIG. 1 depicts an exemplary system in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or cloud resources 152 shown in FIG. 1 and/or other computer(s), and/or the business process server 202 and/or receiving computer 204 and/or communication resources 208 and/or storage resources 210 and/or processing resources 212 and/or third-party monitoring server 216 shown in FIG. 2.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a Business Process Change Monitor and Controller Program (BPCMCP) 148. BPCMCP 148 includes code for implementing the processes described below, including those described in FIGS. 2-5. In one embodiment, computer 102 is able to download BPCMCP 148 from software deploying server 150, including in an on-demand basis, wherein the code in BPCMCP 148 is not downloaded until needed for execution. Note further that, in one embodiment of the present invention, software deploying server 150 performs all of the functions associated with the present invention (including execution of BPCMCP 148), thus freeing computer 102 from having to use its own internal computing resources to execute BPCMCP 148.

Power is provided to one or more of the components depicted in computer 102 from a power device 156. In various embodiments, power device 156 includes a transformer for lowering/raising incoming voltage (e.g., from a power source—not shown), a converter for converting incoming power from one format into another (i.e., converting alternating current into direct current), power storage devices for storing power (i.e., batteries, capacitors, etc.), etc.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
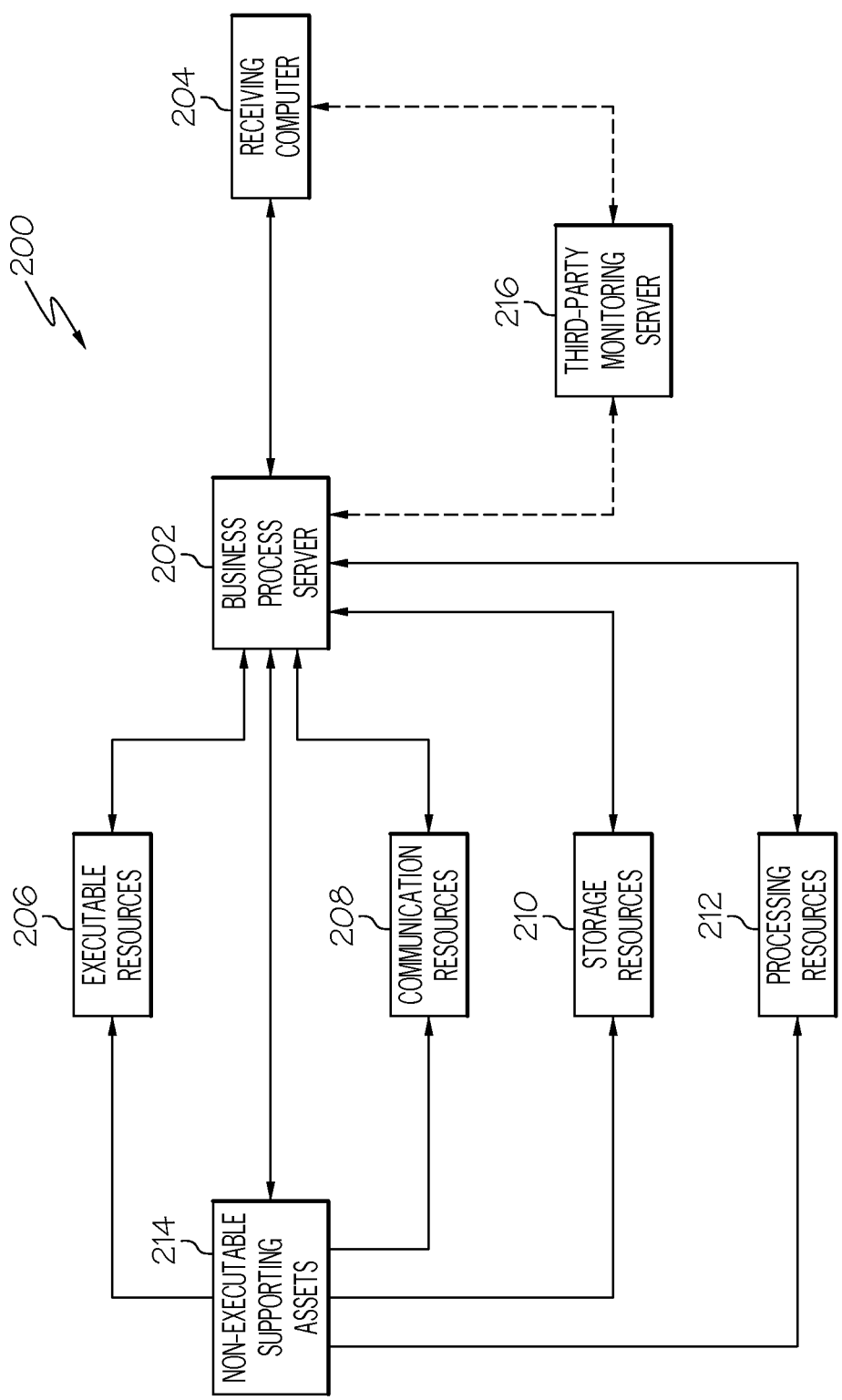
FIG. 2 illustrates an exemplary network of resources that may be used by the present invention.

With reference now to FIG. 2, an exemplary system 200 in which the present invention may be implemented is presented. In one embodiment, the components depicted in FIG. 2 (e.g., business process server 202, receiving computer 204, third-party monitoring server 216, etc.) are arranged in a server-client relationship, such that there is a direct relationship between a client (e.g., the receiving computer 204) and a server (e.g., the business process server 202). Furthermore, and in in one or more embodiments, the present invention is implemented in the context of a "cloud", such that one or more of the elements depicted in system 200 reside on a cloud. A "cloud" is defined as a distributed set of resources, which includes hardware, software, networks, communication links, and other information processing systems in a distributed, on-demand basis. That is, cloud computing (which utilizes a cloud) refers to a type of network computing in which programs not only run on networked servers which are preferably hidden from an end-user, but also retrieve/use the programs themselves (as well as requisite data to run on the programs) from/at shared locations. Thus, multiple parties can share not only computing and storage hardware, but can also share the software (including operating systems and application programs) running on these computing and storage hardware. Thus, both the hardware and software are virtualized when viewed by a user of the cloud.

The shared hardware resources used in cloud computing are connected through communication networks that include, but are not limited to, a Local Area Network (LAN), a Wide Area Network (WAN), and the Internet. A LAN is a computer network that interconnects computers within a limited area, such as a campus of a company, a school, a home, etc. A WAN is a computer network that covers a much larger area, including cities, states, countries, and even the entire world. The Internet is similar to a WAN, but is actually an interconnection of networks, each of which have their own hardware/software resources.

Continuing with the description of FIG. 2 and particularly with regard to business process server 202, as the name implies, business process server 202 serves a business process to a user who is using a client computer, such as receiving computer 204. A "business process" is defined as a collection of related, structured activities for providing a specific service. A business process conceptually is a set of tasks that can be depicted as a flowchart. In order to provide a business process, business process server 202 utilizes executable resources 206 (e.g., software applications), communication resources 208 (e.g., network interconnections), storage resources 210 (e.g., hard drives), and/or processing resources 212 (e.g., processors, computers, servers). Note that the client computer (e.g., receiving computer 204) may be a traditional client computer in a client-server relationship with a server, or the client computer may be any end-user device, including end-user devices on a cloud, a wireless network, a cellular phone network, etc. Thus, the client device may be any device on which a client application can be displayed and interacted with by an end-user, including but not limited to, desktops, laptops, tablets, smartphones, etc.

Communication resources 208 are resources used to provide communication between the executable resources 206, the storage resources 210, the processing resources 212, as well as the business process server 202, receiving computer 204, and/or the third-party monitoring server 216 (discussed below). Examples of such resources include network interface devices (e.g., network interface cards—NICs), the hard wired and wireless media between such devices, etc.

Storage resources 210 are physical and/or virtual devices that store data. Examples of storage resources 210 include, but are not limited to, Redundant Array of Independent Disks (RAID) drives, tape drives, multi-platter hard drives, etc. In one embodiment, storage resources 210 are physical devices. In one embodiment, storage resources 210 are virtual devices, which are emulated in software by processors (e.g., processing resources 212). Of course, even with a virtual device, the data is ultimately stored on a physical device (e.g., a storage device on a cloud of resources).

Processing resources 212 include server farms, server chassis, servers, desktop computers, processors, and/or any similar type of hardware logic capable of executing software instructions. In one or more embodiments of the present invention, processing resources 212 execute instructions from the executable resources 206, provide supporting processing power to the business process server 202 and/or the third-party monitoring server 216 (e.g., through load sharing/load balancing), etc.

Executable resources 206 include, but are not limited to, software application programs. In one or more embodiments of the present invention, these executable resources 206 are visible to a user of the receiving computer 204 on a display. For example, consider FIG. 3, which depicts an exemplary user interface 300, which provides an interface to functions provided by an executable resource used by a business process. In one or more embodiments, the user interface 300 provides both a written description of one or more services provided for the business process (in field 302), and/or provides a flow-chart 304 of sub-processes used by the business process.

In one or more embodiments, a user is able to enter data in a field 306, and to receive results of a business process in field 308 (including results that are the product of data entered into field 306). For example, assume that the business process is to calculate an estimated profit margin for an enterprise. Assume further that a user of user interface 300 enters $1,000,000 into field 306, which is the user's estimate of gross revenues for the current month. Assuming that the business process knows that the monthly overhead (wages, rent, etc.) for the enterprise is $750,000, then the business process will return $250,000 in field 308, which is the estimated net profit for the current month.

Furthermore, user interface 300 includes warning icons, such as a Tier II icon 310 and a Tier I icon 312, which represent various changes to the business process (and/or to resources used by the business process) presented in user interface 300. Details about Tier II icon 310 and Tier I icon 312 are discussed below.

Returning to FIG. 2, in one embodiment a third-party monitoring server 216 monitors the notifications of changes sent from the business process server 202 and/or the responsive actions taken by the receiving computer 204 to the notifications of changes. In one or more embodiments, the third-party monitoring server 216 has the authority/ability to adjust usage of resources (e.g., elements 206, 208, 210, 212) according to how the receiving computer 204 responds (or does not respond within a predetermined length of time) to the notifications of changes to the resources/business process. In one embodiment, this authority/ability to adjust the usage of such resources lies with the business process server 202 and/or the receiving computer 204.

Figure 4:
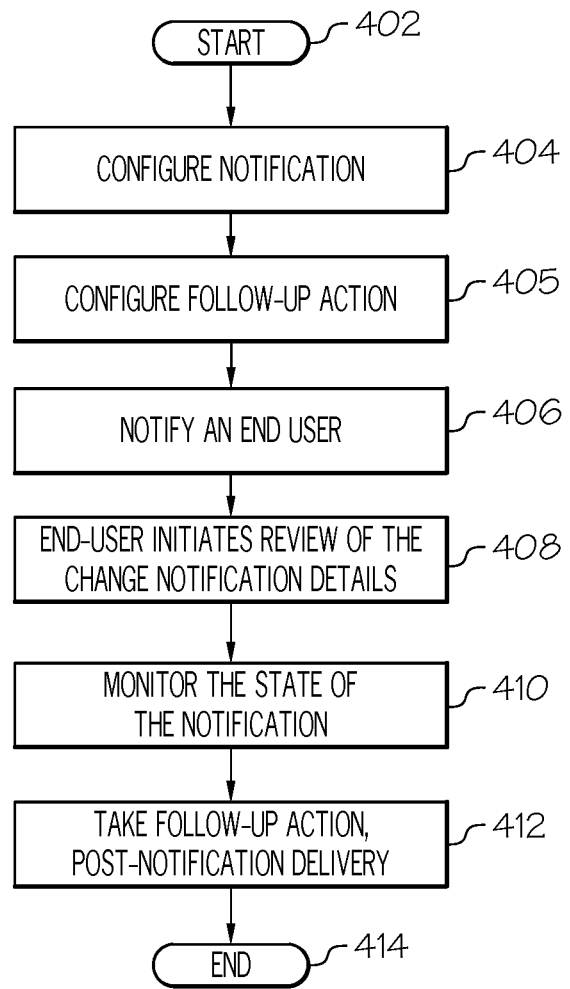
FIG. 4 is a multiple-entity view of one or more operations performed by one or more processors to monitor a response to a notification of a change to a business process.

With reference now to FIG. 4, a multiple-entity view of one or more operations performed by one or more processors to monitor a response to a notification of a change to a business process is presented.

After initiator block 402, notifications for changes to business processes and/or the resources supporting the business processes are configured (block 404). For example, assume that if a business process change occurs, this will result in the need to modify the application logic (an executable resource) and/or a related asset (including non-executable resources such as operation manuals, on-line help resources, enterprise-issued directives for use protocols, etc.). Assume further that a change is made to the application feature (and/or asset) and it is re-deployed.

In one embodiment, an administrative system (e.g., business process server 202 or third-party monitoring server 216), utilizing programmed rules and algorithms, configures the notification system (e.g., also business process server 202 or third-party monitoring server 216) to notify end-users of the changes. This configuration includes identifying whom to notify (specific individuals, all users, user groups, persons holding a certain title/role/security level, etc.), the type and priority of change (to determine the indicator used, if a notification is required at all, etc.), etc.

With regard to identifying whom to notify, certain changes are important to certain users but not to others. For example, assume that the change is to the format that is to be used when entering data into the system. If this data is for currency, a change in currency format from francs to euros is necessary information for data entry operators, but is not important to persons who prepare work schedules. Thus, the notification of the change will be sent to the bookkeepers in the enterprise, but not to the personnel managers who set work schedules for the enterprise's personnel.

Figure 3:
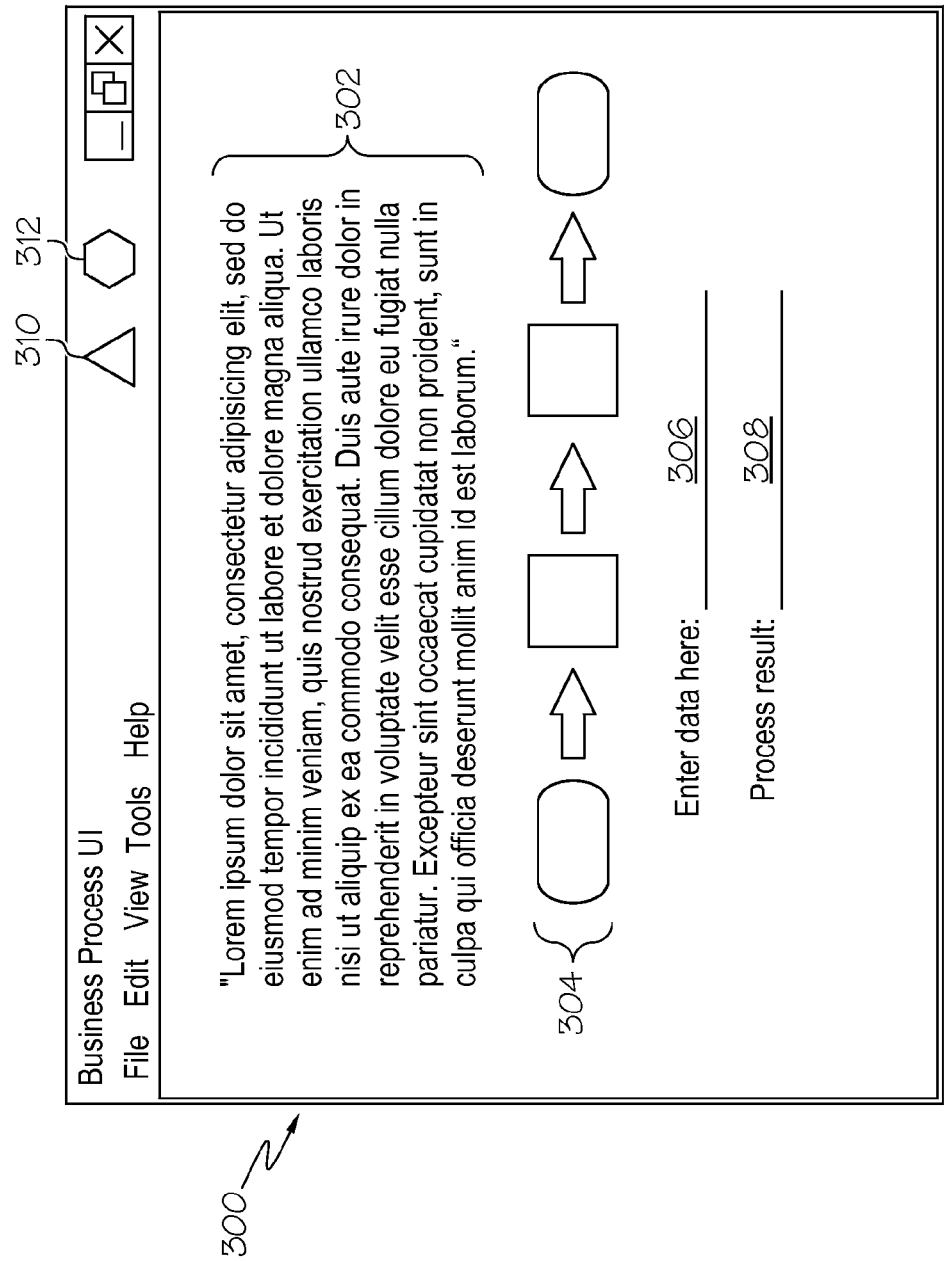
FIG. 3 depicts an exemplary user interface in which notices of changes to resources used by a business process are presented to a user.

With regard to the type and priority of change, consider again FIG. 3, which depicts a Tier II icon 310 and a Tier I icon 312. For exemplary and explanatory purposes, assume that the Tier II icon 310 indicates that there has been a change to the business process (and/or resources used by the business process) that is useful, but not mission critical to the business process. For example, there may be a change to a maximum value that can be entered into field 306. If this maximum is exceeded, a warning will be issued, but the system will nonetheless accept the value that exceeds the new maximum level. However, Tier I icon 312 may be a change to the format of the value that must be used, which is deemed mission critical to the system. For example, the business process may require that dates entered into field 306 now use the format "year-month-day" instead of "month_day,_year". Failure to do so will cause the resource to fail. Thus, this format is mission critical, in that failure to follow it will cause the system to malfunction, including a total failure.

Returning to FIG. 4, in block 405, criteria for follow-up actions to notifications are established. For example, assume that a notification is to let an end-user know that a user's manual, which is used with a particular application, has been changed. The follow-up action (see block 412) may be to advise the end-user that he/she still has not ordered the new user's manual (assuming that this was not done within a predefined period of time—e.g., one week). If the end-user does not order the new user's manual within another ten days, then that end-user may have his rights to use this particular application terminated. Thus, the criteria for the follow-up actions include 1) when to perform the follow-up action (e.g., after one week); 2) what follow-up actions to take (e.g., remind the end-user to order the new user's manual); and/or 3) what actions to take if the follow-up actions are not complied with (e.g., prevent the user from using the particular application that is supported by the new user's manual).

Continuing with FIG. 4, in block 406 the end-user is notified of the change to the business process and/or the supporting executable/non-executable support resources. Assume now that a change notification is available for the business processes, including an underlying executable application and/or a related non-executable asset (e.g., an instruction manual). An end-user, upon logging into the application receives the notification. As depicted in FIG. 3, this notification comes in the form of one or more icons, such as the Tier II icon 310 and Tier I icon 312 discussed above. Such icons (e.g., Tier II icon 310 and Tier I icon 312) appear in the menu bar to indicate that a process change has occurred. Note that in one or more embodiments of the present invention, such notifications are not limited to icons such as Tier II icon 310 and Tier I icon 312, but rather may appear in other forms to the end-user, such as a dialog box, a pop-up window, an audible alarm, etc.

If an icon is used, it may contain visual cues as to the importance or type of change. For example, shape and/or color can be used for these visual cues. These shapes/colors can be configured in the process described above with reference to block 404. In one embodiment, the shape and color of the icon identifies how critical it is for the user to comport with the change. That is, a RED STOP sign may indicate that failure to comport with the change will cause the business process to malfunction and/or completely stop, while a YELLOW WARNING sign may indicate that failure to comport with the change may degrade, but will not damage or otherwise cause the business process to fail.

In another embodiment, the color and/or shape of the icon identifies what type of resource has changed. For example, the shape/color of the icon may be a RED STOP sign to indicating the notification relates to a business/application process change. Similarly, a YELLOW WARNING sign or a BOOK image may indicate that a change was made to process guidance or help documents. That is, in one embodiment of the present invention, a first shape/color (e.g., RED STOP sign) may indicate a change to an executable resource, while a second shape/color (e.g., YELLOW WARNING sign) may indicate a change to a non-executable resource, such as an operation manual.

In one embodiment of the present invention, the notification of the change to the business process and/or the associated executable/non-executable resources is associated with a particular user's identity, that user's role within an enterprise, a certain privilege group, etc. Thus, by specifying who (by name, role, group, etc.) needs to get the notice/notification of the change, then the notification does not need to be sent to all users of the business process, since the change would not affect them and/or their use of the business process resources.

In one embodiment of the present invention, the notification is displayed only when the application feature (or sub-feature) is initiated, thereby being context-sensitive. That is, a business process may have multiple executable/non-executable resources associated with it. A user may utilize several of these executable/non-executable resources that have had no changes. At this point, no notices are sent to that user, since they would not be relevant to his/her work. However, as soon as this same user access/utilizes a resource within the business process that has changed, then the notification is then sent to that user. In another embodiment, the notification is sent to the end-user whenever a relevant executable resource is launched, even if the end-user is unaware of the launch. That is, a user may be using a program that calls a particular executable resource, which may have associated non-executable resources (e.g., manuals). Even though the user has not expressly directly called up the non-executable resource (which was called up "behind the scenes" by a program with which the user is interfacing), the user may still need to know about changes to the called particular executable resource and/or the associated non-executed resources. Therefore, in alternate embodiments, the delivery of the notification and the display of the notification can occur simultaneously or at different times. For example, a notification may be both delivered and displayed at the launch of a relevant executable resource. In another embodiment, the notification may be delivered at the launch of the executable resource; however, it is displayed only when the context for the configured notification is relevant to the user. In a third embodiment, the notification may be delivered at the time the user calls up the changed application feature/associated non-executed resource, and the notification is displayed at that same time.

With reference still to FIG. 4, block 408 describes the process of the end-user of the business process initiating a review of the change notification details. Thus, at this point in the operation, the change notification has been delivered/displayed to the end-user. The user initiates a review of the notification details. That is, the user performs some type of operation that indicates that he/she is aware of the notification. Examples of such operations include, but are not limited to, hovering over the notification (icon, box, pop-up, etc.), clicking on the notification field/icon, inputting certain keystrokes or touchscreen points to indicate acknowledgement of the notification, etc.

In an embodiment in which the user acknowledges the presence of the change notification icon by hovering over the change notification icon (e.g., Tier II icon 310 of Tier I icon 312 shown in FIG. 3) a brief description of the changes is displayed in a pop-up window (not shown in FIG. 3). When other gestures are used, the details of the change are displayed, and/or the changed artifact is displayed (as determined by the configured notification).

As described in block 410 in FIG. 4, a monitoring entity (i.e., the third-party monitoring server 216, the business process server 202, and/or the receiving computer 204 shown in FIG. 2) monitors the state of the notification (i.e., what response, if any, to the notification has been made by the user of the receiving computer). Thus, after the notifications have been configured and delivered by the system (e.g., from the business process server 202 to the receiving computer 204 shown in FIG. 2), and the state of (i.e., response to) the notification has been monitored by the system, the system determines the notification state. Examples of such notification states include, but are not limited to, whether or not the notification has been delivered; to whom the notification has been sent; who has acknowledged the notification; what actions, if any, have been taken by the receiver in response to the notification, etc.

Figure 5:
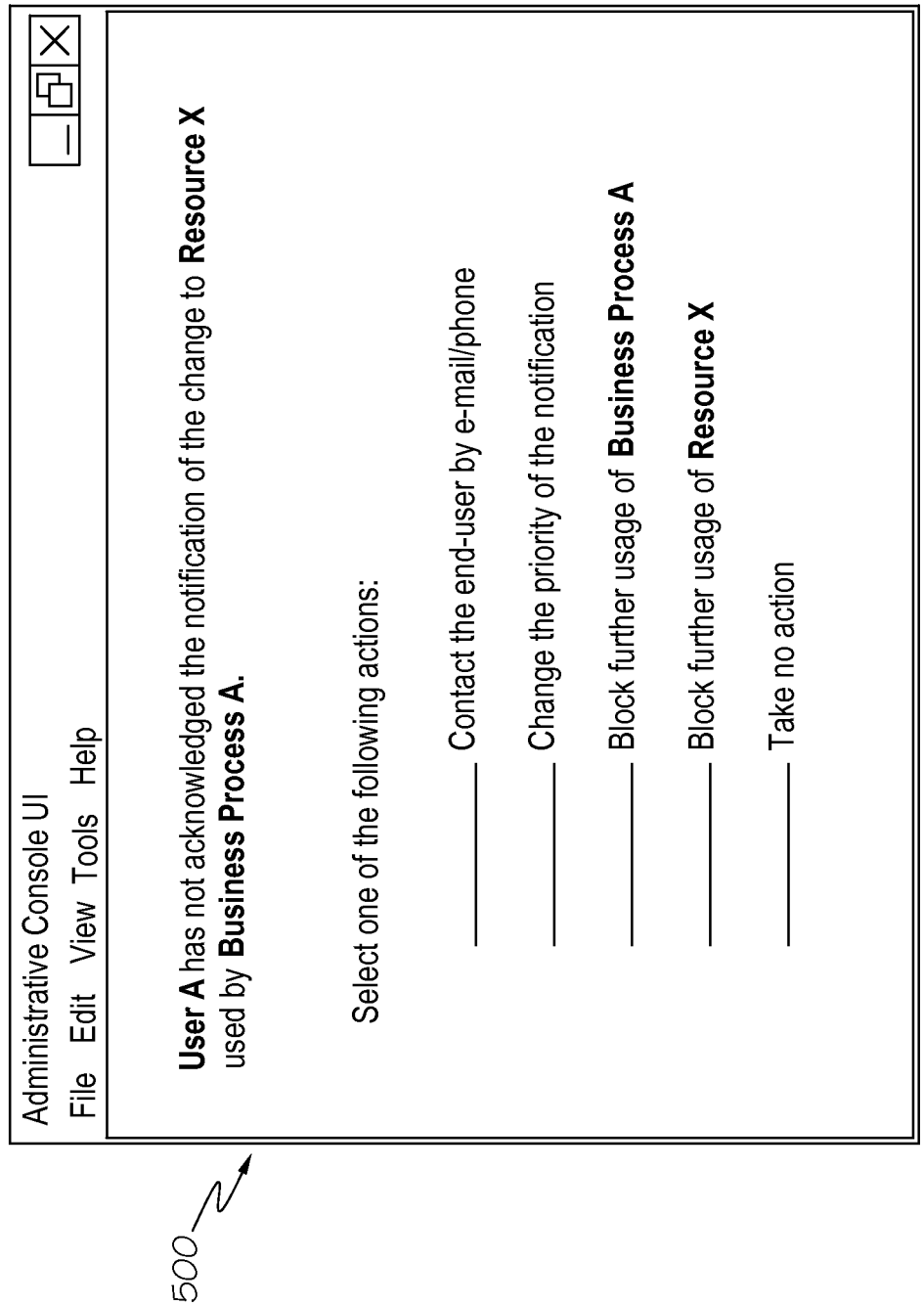
FIG. 5 illustrates an exemplary user interface presented to an administrator in response to an end-user failing to respond to a notice of a change to resources used by a business process.

As depicted in block 412 in FIG. 4, a follow-up action (which is post-notification delivery to the receiving computer) is taken. That is, as described herein, the state of the notification (e.g., whether the notification has been delivered and to whom, who has acknowledged the notification, etc.) has been determined. Based on this determined notification state, an administrative console or application is displayed and an administrator may take action on a notification based upon its state. For example, FIG. 5 illustrates an exemplary user interface 500 presented to an administrator (e.g., user of business process server 202 and/or third-party monitoring server 216 shown in FIG. 2) in response to an end-user (e.g., user of receiving computer 204 shown in FIG. 2) failing to respond to a notice of a change to resources used by a business process. Options presented to the administrator include, but are not limited to, directing the administrator to contact the end-user by other means (such as e-mail); changing the priority of the notification; locking the end-user's account, application access, or privilege in some manner until the change notification is reviewed; etc.

The flow-chart depicted in FIG. 4 ends at terminator block 414.

Figure 6:
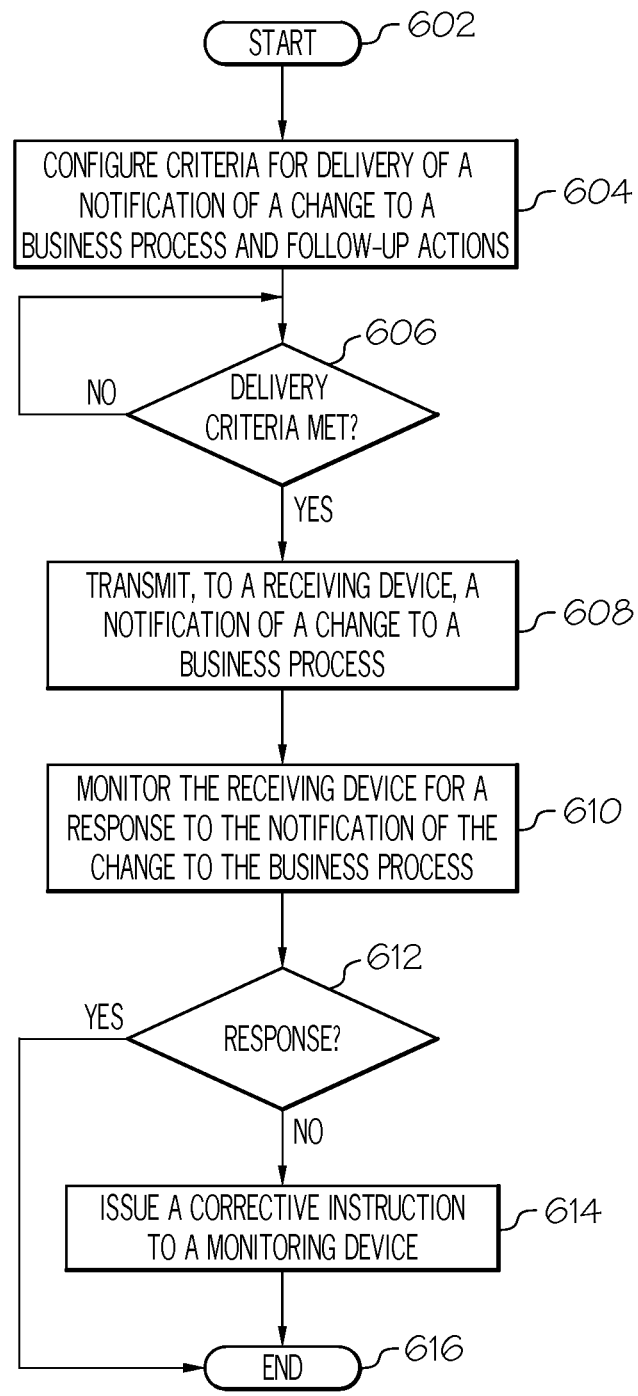
FIG. 6 is a high level flow-chart of one or more operations performed by one or more processors for a single entity to monitor a response to a notification of a change to a business process.

With reference now to FIG. 6, a high level flow-chart of one or more operations performed by one or more processors for a single entity to monitor a response to a notification of a change to a business process is presented.

After initiator block 602, criteria for delivery of a notification of a change to a business process are configured (block 604). As described herein, the business process is a collection of on-line services that produce a defined service. The criteria include, but are not limited to, who is to receive the notification; what the level of importance of the notification is; what constitutes a "change" to the resources; etc. Similarly, criteria for any follow-up actions to be taken after the notification is sent are established. These criteria are similar to those described above with reference to block 405 in FIG. 4.

As depicted in query block 606, a query is made as to whether or not the criteria set in block 604 have been met.

As described in block 608, in response to the criteria being met, the notification of the change to the business process is transmitted to a receiving device (i.e., a system used by a user of the business process).

As described in block 610, the receiving device is then monitored for a response to the notification of the change to the business process.

As described in block 612, a query is made as to whether or not the receiving device has provided an appropriate response to the notification. For example, the notification may require the end-user to access a new training manual. If the user does not do so within a predefined amount of time, then the end-user has not responded appropriately to the notification.

As described in block 614, in response to detecting no response to the notification of the change to the business process from the receiving device within a predefined amount of time, a corrective instruction is issued to a monitoring device, which may be the business process server 202, the receiving computer 204, and/or the third-party monitoring server 216 shown in FIG. 2).

The flowchart depicted in FIG. 2 ends at terminator block 616.

In one or more embodiments of the present invention, the monitoring device is a business process server that provides the business process. In one embodiment, the corrective instruction directs the business process server to block the receiving device from accessing the business process.

In one or more embodiments of the present invention, the monitoring device is the receiving device. In one embodiment, the corrective instruction directs a user of the receiving device to access an instructional resource (e.g., an "owner's manual", an instruction manual, a "help" manual, which are available for order in a hard copy version in one embodiment, and/or are available in a soft copy version on-line) for instructions on how to use the business process with the change.

In one or more embodiments of the present invention, a role of a recipient of the notification is identified. Based on that identified role of the recipient, the notification of the change to the business process is tailored based on the role of the recipient of the notification. That is, the notification is tailored for content, delivery, and/or appearance. For example, one role of user may not receive the notice at all, while another role of user may receive an "urgent" notification, while another role of user may receive a red icon alert indicator of the notification.

In one or more embodiments of the present invention, the notification of the change to the business process is appended to a cloud-based resource that supports the business process. For example, assume that the executable resources 206 shown in FIG. 2 are cloud-based (i.e., are stored on a cloud of resources, as described above). Whenever a change occurs to one of these executable resources 206, a change icon is associated with that changed executable resource. This change icon is linked to a description of the change, and/or any actions/resources/steps needed to accommodate this change. Thus, whenever an end-user accesses that particular executable resource, the notification accompanies a user interface associated with that executable resource (see FIG. 3 above). That is, the appended icon representing the change to the business process to the cloud-based resource is presented to a user who accesses the cloud-based resource on that user interface.

In one or more embodiments of the present invention, a change to the business process is a change to a supporting asset in the business process. The supporting asset provides non-executable information describing an executable resource (e.g., an "owner's manual") used by the business process. In one embodiment, an icon is generated that represents the change to the supporting asset. The icon is appended to a user interface provided by the executable resource. In response to detecting an activation of the icon, a summary of the change to the supporting asset is displayed on the user interface (e.g., by a pop-up window, a text box, etc.).

Note that in one embodiment, notification of the change to the executable resource and/or the non-executable supporting asset is presented in a medium other than visual (e.g., an icon). For example, the notification of the change may be aural (i.e., a particular tone, sound, tune, spoken word, etc. that is presented via a speaker to the end-user), tactile (i.e., a particular vibration from the end-user's device), etc.

In one or more embodiments of the present invention, the change to the business process is a change to an executable resource used by the business process. In one embodiment, the executable resource used by the business process is identified, and a change to the executable resource is also identified. A notification of the change to the executable resource is generated and transmitted to a user interface on the receiving device.

In one or more embodiments of the present invention, a response to the notification of the change to the executable resource is identified by detecting a change in usage protocol followed by a user of the executable resource. For example, if a user receives a change notification instructing him to start using the date format "year_month_day" instead of "month_day,_year", and the user is now using the date format "year_month_day", then the system interprets this act by the user as proof that the user has received and is properly responding to the notification of the change.

In one or more embodiments of the present invention, a further change to the business process is a change to a supporting asset for the executable resource. As described herein, the supporting asset (e.g., an "owner's manual") provides non-executable information describing the executable resource. In one embodiment, the supporting asset for the executable resource in the business process is identified. A change to the supporting asset is identified. A notification of the change to the supporting asset is generated and transmitted to a user interface on the receiving device.

In one or more embodiments of the present invention, the executable resource is a cloud-based resource. In one embodiment, an icon that represents the change to the executable resource is generated. The icon is color-coded with a color to generate a color-coded icon. The color-coded icon is appended to the cloud-based resource. The color-coded icon along with the executable resource are then presented on the user interface to a user who accesses the cloud-based resource, such that both the color-coded icon and the executable resource are presented with the cloud-based resource.

In one or more embodiments of the present invention, the supporting asset is a cloud-based resource. That is, the supporting asset (e.g., the "owner's manual") is stored in a database on a cloud (defined above). This storage may be of a soft copy of the supporting (non-executable) asset, or the storage may be of a location (e.g., a website) from which a hard copy of the supporting asset may be ordered. An icon that represents the change to the cloud-based supporting asset is appended to the location on which the supporting asset (or its location) is stored. The icon is color-coded to generate a color-coded icon, which is appended to the cloud-based resource (or its location). The color-coded icon is then presented on the user interface to a user who accesses the cloud-based resource, such that the color-coded icon is presented with the cloud-based resource (or its location).

In one or more embodiments of the present invention, the response to the notification of the change is identified by detecting a user of the business process retrieving the change to the supporting asset. That is, assume that the notification tells the user that there is a change to the owner's manual used by the business process. If the user then retrieves the new owner's manual (either electronically or by ordering a hard copy from a particular website), then the appropriate response apparently has been taken.

In one or more embodiments of the present invention, the corrective instruction to the receiving device is an instruction to a user of the business process to retrieve the change to the non-executable information describing the executable resource. That is, in this embodiment, the end-user takes the appropriate response to the notification if he/she retrieves the changes to the supporting material (e.g., the "owner's manual"), but not the entire document (e.g., "owner's manual).

In one or more embodiments of the present invention, the corrective instruction to the receiving device is an instruction to block the receiving device from accessing the business process until the non-executable information is retrieved by a user of the business process, as described herein.

Thus, in one or more embodiments of the present invention, the present invention presents a method, system, and/or computer program product for notifying end-users when changes to an application or application's intellectual property asset, such as help, training, or process guidance has been made, and then monitoring their responses.

The invention is beneficial to enterprises dealing with changes to their applications and intellectual property assets, including those deploying in the cloud or with a large geographical distribution of end-users, by delivering change notifications to the right end-users, and then monitoring that notifications are sent/received in a timely fashion (when end-users are using the application). As described herein, in one or more embodiments the notifications are in the context of the application (or intellectual property such as "owner's manuals") for which the change(s) apply.

Note further that the present invention supports the capability for the end-user (of the application) to initiate an action which displays the changed asset or descriptions of the changes.

Additionally, the present invention provides administration support. It supports configuring the notification to indicate the relative importance/priority of the change. It supports monitoring who has received/reviewed the notification. And the present invention supports follow-up actions that may be taken based upon notification status, such as "forcing" the end-user to view a change notice dialog if too much time has passed since the notice was originally delivered.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method to monitor a response to a notification of a change to a business process, the method comprising:
configuring, by one or more processors, criteria for delivery of a notification of a change to a business process, wherein the business process is a collection of on-line services that produce a defined service;
in response to the criteria being met, transmitting, to a receiving device, the notification of the change to the business process;
monitoring, by one or more processors, the receiving device for a response to the notification of the change to the business process; and
in response to detecting no response to the notification of the change to the business process from the receiving device within a predefined amount of time, issuing, by one or more processors, a corrective instruction to a monitoring device, wherein the monitoring device is a business processor server that provides the business process, and wherein the corrective instruction directs the business process server to block the receiving device from accessing the business process.

2. The method of claim 1, wherein the monitoring device is a business process server that provides the business process, and wherein the corrective instruction directs the business process server to block the receiving device from accessing the business process.

3. The method of claim 1, wherein the monitoring device is the receiving device, and wherein the corrective instruction directs a user of the receiving device to access an instructional resource for instructions on how to use the business process with the change.

4. The method of claim 1, further comprising:
identifying, by one or more processors, a role of a recipient of the notification; and
tailoring, by one or more processors, the notification of the change to the business process based on the role of the recipient of the notification.

5. The method of claim 1, further comprising:
appending, by one or more processors, the notification of the change to the business process to a cloud-based resource that supports the business process; and
representing, by one or more processors, said appending of the change to the business process to the cloud-based resource with a visual icon, wherein the visual icon is presented to a user who accesses the cloud-based resource.

6. The method of claim 1, wherein a change to the business process is a change to a supporting asset in the business process, wherein the supporting asset provides non-executable information describing an executable resource used by the business process, and wherein the method further comprises:
generating, by one or more processors, an icon that represents the change to the supporting asset;
appending, by one or more processors, the icon to a user interface provided by the executable resource; and
in response to detecting an activation of the icon, displaying, by one or more processors, a summary of the change to the supporting asset on the user interface.

7. The method of claim 1, wherein the change to the business process is a change to an executable resource used by the business process, and wherein the method further comprises:
identifying, by one or more processors, the executable resource used by the business process;
identifying, by one or more processors, a change to the executable resource;
generating, by one or more processors, a notification of the change to the executable resource; and
transmitting, to a user interface on the receiving device, the notification of the change to the executable resource.

8. The method of claim 7, further comprising:
identifying, by one or more processors, a response to the notification of the change to the executable resource by detecting a change in usage protocol followed by a user of the executable resource.

9. The method of claim 7, wherein a further change to the business process is a change to a supporting asset for the executable resource, wherein the supporting asset provides non-executable information describing the executable resource, and wherein the method further comprises:
identifying, by one or more processors, the supporting asset for the executable resource in the business process;
identifying, by one or more processors, a change to the supporting asset;
generating, by one or more processors, a notification of the change to the supporting asset; and
transmitting, to the receiving device, the notification of the change to the supporting asset to the user interface on the receiving device.

10. The method of claim 7, wherein the executable resource is a cloud-based resource, and wherein the method further comprises:
generating, by one or more processors, an icon that represents the change to the executable resource;
color coding, by one or more processors, the icon with a color to generate a color-coded icon;
appending, by one or more processors, the color-coded icon to the cloud-based resource; and
presenting, by one or more processors, the color-coded icon and the executable resource on the user interface to a user who accesses the cloud-based resource, wherein the color-coded icon is presented with the cloud-based resource.

11. The method of claim 9, wherein the supporting asset is a cloud-based resource, and wherein the method further comprises:
generating, by one or more processors, an icon that represents the change to the supporting asset;
color coding, by one or more processors, the icon to generate a color-coded icon;
appending, by one or more processors, the color-coded icon to the cloud-based resource; and
presenting, by one or more processors, the color-coded icon on the user interface to a user who accesses the cloud-based resource, wherein the color-coded icon is presented with the cloud-based resource.

12. The method of claim 9, further comprising:
identifying, by one or more processors, the response to the notification of the change by detecting a user of the business process retrieving the change to the supporting asset.

13. The method of claim 9, wherein the corrective instruction to the receiving device is an instruction to a user of the business process to retrieve a change to the non-executable information describing the executable resource.

14. The method of claim 9, wherein the corrective instruction to the receiving device is an instruction to block the receiving device from accessing the business process until the non-executable information is retrieved by a user of the business process.

* * * * *